(12) United States Patent
Tian et al.

(10) Patent No.: US 9,094,996 B2
(45) Date of Patent: Jul. 28, 2015

(54) METHOD AND A BASE STATION FOR ALLOCATION MEASUREMENT GAPS

(75) Inventors: Yang Tian, Beijing (CN); Dian Wang, Beijing (CN); Huaisong Zhu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 14/003,913

(22) PCT Filed: Mar. 15, 2011

(86) PCT No.: PCT/CN2011/000408
§ 371 (c)(1),
(2), (4) Date: Sep. 9, 2013

(87) PCT Pub. No.: WO2012/122673
PCT Pub. Date: Sep. 20, 2012

(65) Prior Publication Data
US 2014/0010189 A1    Jan. 9, 2014

(51) Int. Cl.
*H04W 72/12* (2009.01)
*H04L 1/18* (2006.01)
(Continued)

(52) U.S. Cl.
CPC ......... *H04W 72/1247* (2013.01); *H04L 1/1822* (2013.01); *H04W 24/10* (2013.01); *H04W 36/0088* (2013.01); *H04L 1/1812* (2013.01); *H04L 1/1887* (2013.01)

(58) Field of Classification Search
None
See application file for complete search history.

(56) References Cited

U.S. PATENT DOCUMENTS

2009/0168731 A1* 7/2009 Zhang et al. ............... 370/336
2010/0034126 A1* 2/2010 Kitazoe et al. ............. 370/310
(Continued)

FOREIGN PATENT DOCUMENTS

| CN | 101651877 A | 2/2010 |
|---|---|---|
| WO | 2009090583 A1 | 7/2009 |
| WO | 2010109764 A1 | 9/2010 |

OTHER PUBLICATIONS

3rd Generation Partnership Project, Technical Specification Group Radio Access Network; Evolved Universal Terrestrial Radio Access (E-UTRA); Requirements for support of radio resource management (Release 10), 3GPP TS 36.133 v10.1.0, 3rd Generation Partnership Project, Dec. 2010.*

(Continued)

*Primary Examiner* — Jae Y Lee
*Assistant Examiner* — Diane Lo
(74) *Attorney, Agent, or Firm* — Murphy, Bilak & Homiller, PLLC (57) ABSTRACT

A radio base station and a method therein are provided for allocating measurement gaps within a MGRP to UEs currently being served by the base station, wherein consideration is taken to the impact a measurement gap has on the HARQ processes. A plurality of possible measurement gaps are identified within the MGRP with regards to their starting point and duration in time within the MGRP. A number of HARQ processes that would be affected due to the identified measurement gaps with regards to a starting point in time of the identified measurement gaps during the MGRP are determined for the identified measurement gaps. The identified measurement gaps are ranked depending on the number of HARQ processes which would be affected during the MGRP and the identified measurement gaps are allocated to the UEs based on the ranking.

16 Claims, 4 Drawing Sheets

(51) Int. Cl.
*H04W 24/10* (2009.01)
*H04W 36/00* (2009.01)

(56) References Cited

U.S. PATENT DOCUMENTS

2011/0199908 A1* 8/2011 Dalsgaard et al. ............ 370/241
2012/0051329 A1  3/2012 Hirano et al.

OTHER PUBLICATIONS

LG Electronics Inc. "HARQ Feedback and Measurement Cap," 3GPP Shenzhen, China, Mar. 31-Apr. 2008. R2-081602. Mar. 25, 2008.

Unknown, Author, "HARO based TOM patterns for BT conversational voice", Qualcomm Incorporated, 3GPP TSG-RAN WG2 Meeting #73, R2-111282, Taipei, Taiwan, Feb. 21-25, 2011, 1-8.

* cited by examiner

METHOD AND A BASE STATION FOR ALLOCATION MEASUREMENT GAPS

TECHNICAL FIELD

Embodiments herein relate generally to measurement gap allocation Embodiments herein relate in particular to allocation of measurement gap with regards to the impact on data communication.

BACKGROUND

In LTE, Long Term Evolution, a User Equipment needs to identify and measure inter-frequency and/or inter-RAT (Radio Access Technology) cells in order to support mobility or Automatic Neighbor Related, ANR, functions. ANR functions belong to Self-Optimizing Network, SON, functions. An example is to automatically find neighbor relations and/or neighbor cells. In order to perform the identification and the measurements, the User Equipment (UE) requires measurement gaps during which the UE may perform these actions.

During these measurement gaps, the UE is not allowed to transmit or receive any data and/or to tune its receiver on the Evolved Universal Terrestrial Radio access Network, E-UTRAN, serving carrier frequency based on the UE's own capability.

The base station, or evolved Node B (eNB), provides the UE with a measurement configuration, which is specified by a Measurement Gap Length, MGL, and a Measurement Gap Repetition Period, MGRP. During a measurement gap, the UE is not allowed to transmit or to receive signals on the serving carrier.

Within each MGRP, a measurement gap starts at a System Frame Number (SFN) and subframe. The time from the beginning of the MGRP to the beginning of the measurement gap is referred to as a gap offset.

In LTE, Hybrid Automatic Repeat Request, HARQ, transmissions follow certain timing sequences, and different HARQ processes or transmissions run simultaneously with different HARQ starting subframes. In Frequency Division Duplex, FDD, mode, the timing sequence of downlink and uplink HARQ transmission is the same for different starting subframes, i.e. for downlink HARQ timing, the uplink acknowledgement, ACK, and/or negative acknowledgement, NACK, timing delay is the same for Packet Data Control Channel, PDCCH, and Physical Downlink Shared Channel, PDSCH, transmission in different subframes. Likewise, for uplink HARQ timing, the Physical Uplink Shared Channel, PUSCH, delay and the Physical Hybrid ARQ Indicator Channel, PHICH, delay are the same for PDCCH grant and/or PHICH ACK/NACK in different subframes. As a consequence, different gap offsets have the same impact on data interruption for downlink and uplink HARQ transmissions, provided that the MGL is the same.

However, in Time Division Duplex, TDD, mode, the delays are different for different uplink and downlink configurations or different HARQ starting subframes of the same uplink/downlink configuration. As a consequence, different gap offsets have different impact on data interruption. As a consequence, there is a problem that data transmission may be interrupted to a substantial extent.

SUMMARY

It is an object of the embodiments to address at least some of the problems outlined above. In particular, it is an object of the embodiments to provide a radio base station and a method therein for allocating measurement gaps within a MGRP to UEs currently being served by the base station, wherein consideration is taken to the impact a measurement gap has on the HARQ processes. These objects and others may be obtained by providing a radio base station and a method therein according to the independent claims attached below.

According to an aspect, a method in a base station for allocating measurement gaps within a Measurement Gap Repetition Period, MGRP, to User Equipments, UEs, currently being served by the base station is provided. The method comprises identifying a plurality of possible measurement gaps within the MGRP with regards to their starting point and duration in time within the MGRP. The method further comprises determining, for the identified measurement gaps, a number of Hybrid Automatic Repeat Request, HARQ, processes that would be affected due to the identified measurement gaps with regards to a starting point in time of the identified measurement gaps during the MGRP. The method also comprises ranking the identified measurement gaps depending on the number of HARQ processes which would be affected during the MGRP, and allocating the identified measurement gaps to the UEs based on the ranking.

According to a further aspect, a radio base station is provided adapted to allocate measurement gaps within a Measurement Gap Repetition Period, MGRP, to User Equipments currently being served by the base station. The base station comprises a processing unit adapted to identify a plurality of possible measurement gaps within the MGRP and to determine, for the identified measurement gaps, a number of Hybrid Automatic Repeat Request, HARQ, processes that would be affected due to the identified measurement gaps with regards to a starting point in time of the identified measurement gaps during the MGRP. The processing unit it further adapted to rank the identified measurement gaps depending on the number of HARQ processes which would be affected during the MGRP and to allocate the identified measurement gaps to the UEs based on the ranking.

The radio base station and the method therein have several advantages. By ranking the measurement gaps depending on the number of HARQ processes which would be affected during the MGRP, the base station may allocate measurement gaps upon different criteria. Further, the base station is able to schedule the radio resources according to the allocation of measurement gaps such that during a measurement gap for a certain UE, the base station avoids scheduling radio resources to this UE and instead schedule radio resources to other UEs, which are allocated different measurement gaps.

The criteria may for example be to improve overall cell performance. For such criteria, by allocating the measurement gaps affecting the lowest number of HARQ processes first, it is possible to minimize the influence of measurement gaps on the HARQ processes. This way, the overall performance of a cell may be improved.

The criteria may in another example be to prioritize high-priority UEs so that they are influenced to a minimal extent by the measurement gap. This may be achieved by allocating the UEs having the highest scheduling priorities to the measurement gaps affecting the lowest number of HARQ processes.

BRIEF DESCRIPTION OF DRAWINGS

Embodiments will now be described in more detail in relation to the accompanying drawings, in which.

DETAILED DESCRIPTION

Briefly described, exemplifying embodiments of a method in a base station and a base station are provided for allocating measurement gaps within an MGRP to UEs currently being served by the base station. The allocation is performed in such a way that measurement gaps associated with the least data interruption are allocated to UEs currently being served by the base station before measurement gaps associated with more data interruption are allocated.

Typically, the MGL is 6 ms and the MGRP is 40 ms or 80 ms. However, other values of the MGL and the MGRP are possible. Within each MGRP, the measurement gap starts at an SFN and subframe meeting the following condition: SFN mod T=FLOOR(gap offset/10) and subframe=gap offset mod 10, where T=MGRP/10 and gap offset={0, . . . , MGRP−1}. See e.g. technical specification 3GPP 36.331. The condition defines the relation between SFN, subframe and MGRP. The relation may be used by the UE and the base station to determine the position of the measurement gap in the time domain.

Figure 1:
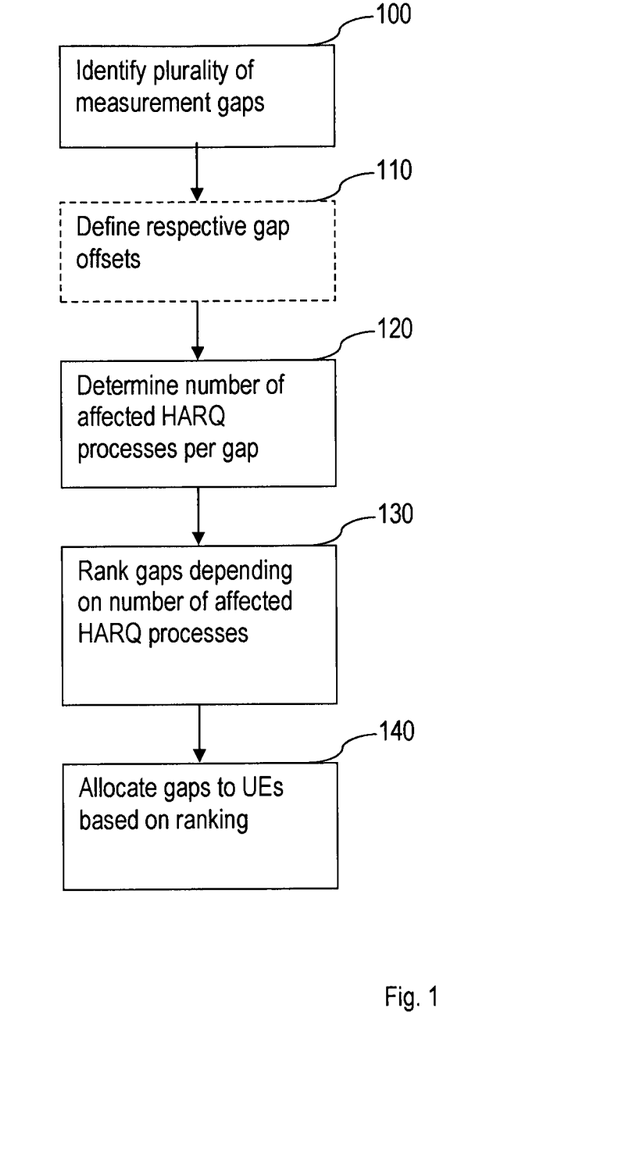
FIG. 1 is a flowchart of an exemplifying embodiment of a method for allocating measurement gaps within an MGRP to UEs currently being served by the base station.

An exemplifying embodiment of such a method for allocating measurement gaps will now be described with reference to the flowchart in FIG. 1. In this example, the method comprises identifying 100 a plurality of possible measurement gaps within the MGRP with regards to their starting point and duration in time within the MGRP.

The method further comprises determining 120, for the identified measurement gaps, a number of HARQ processes that would be affected due to the respective identified measurement gaps with regards to a starting point in time of the identified measurement gaps during the MGRP.

The method further comprises ranking 130 the identified measurement gaps depending on the number of HARQ processes which would be affected during the MGRP due to the respective measurement gaps and allocating 140 the identified measurement gaps to the UEs based on the ranking.

This exemplifying method has several advantages. By ranking the measurement gaps depending on the number of HARQ processes which would be affected during the MGRP, the base station may allocate measurement gaps upon different criteria. Further, the base station is able to schedule the radio resources according to the allocation of measurement gaps such that during a measurement gap for a certain UE, the base station avoids scheduling radio resources to this UE and instead schedule radio resources to other UEs, which are allocated different measurement gaps.

Further, radio resources are allocated over the MGRP to UEs currently not being involved in measurements during a measurement gap. Since a UE being currently involved in measurements during a measurement gap may not transmit or receive communication data in a HARQ process, resources are not allocated to that UE.

According to an embodiment, the method further comprises first allocating the identified measurement gap affecting the lowest number of HARQ processes to a UE followed by allocating the next identified measurement gap affecting the second lowest number of HARQ processes to a further served UE, and so forth, until all UEs which are being served by the base station are allocated a measurement gap.

By allocating the measurement gaps affecting the lowest number of HARQ processes first, it is possible to minimize the influence of measurement gaps on the HARQ processes. This way, the overall performance of a cell may be improved.

It shall be noted that several different measurement gaps may affect an equal number of HARQ processes. By "different" is meant different starting point in time, in relation to the starting point of the MGRP, within the MGRP. For example, if there are eight different measurement gaps affecting the same number of HARQ processes and if these eight measurement gaps all affect the least number of HARQ processes, then these eight measurement gaps are allocated first to eight of the UEs currently being served by the base station. Thereafter, the measurement gap or gaps affecting the second least number of HARQ processes will be allocated to UE(s) and so on.

In an example, the method comprises obtaining scheduling priorities for the UEs, wherein the UE having the highest scheduling priority is allocated the identified measurement gap affecting the lowest number of HARQ processes. Then, the remaining UEs are allocated measurement gaps in descending order, with regards to scheduling priority, such that the UE having the lowest scheduling priority is allocated the identified measurement gap affecting the highest number of HARQ processes of the available identified measurement gaps.

By allocating the UEs having the highest scheduling priorities to the measurement gaps affecting the lowest number of HARQ processes, is it possible to prioritize high-priority UEs so that they are influenced to a minimal extent by the measurement gap. If, e.g. there are eight measurement gaps affecting a minimal number of HARQ processes and there are only four UEs being served by the base station, then all the UE may be allocated a measurement gap affecting a minimal number of HARQ processes regardless of their respective scheduling, priorities.

In yet an example, the method further comprises defining 110 respective gap offsets as the time from the beginning of the MGRP to the beginning of each of the plurality of possible measurement gaps and initializing a bitmap of gap offsets by setting all bits to "0", each bit corresponding to a gap offset. When an identified measurement gap is being allocated a UE, a corresponding gap offset is allocated and its bit in the bitmap is set to "1".

The number of gap offsets and corresponding bits in the bitmap equals a number of subframes in the MGRP.

MGRP/FRP (Frame Repetition Period) number of gap offsets have the same affect on the HARQ processes during a MGRP. An FRP will be explained below. Hence a specific gap offset, k, affects the same number of HARQ processes starting at k, k+FRP, k+2*FRP and so on. A specific measurement gap, k, may be allocated at: "k+i*FRP", where i={0, 1, . . . , MGRP/FRP−1}. For every repeated gap offset and corresponding measurement gap, the gap offset and measurement gap is allocated a different UE.

In this manner, there may be a plurality of measurement gaps affecting an equal number of HARQ processes.

In the TD-LTE system, uplink and downlink subframes are located in the same frequency band, but at different time slices. An operator is free to configure uplink and downlink subframe according to his/her own network deployment policy. There are seven different kinds of downlink-uplink configurations defined by the 3GPP standard 36.211. Two configuration examples are DL:UL=3:2 and DL:UL=4:1. In the first example, a frame of 10 ms comprises 3 downlink subframes, 2 uplink subframes and then again 3 downlink subframes and 2 uplink subframes. This means that the FRP is 5 since the first 3 downlink subframes and 2 uplink subframes are repeated continuously. If the MGRP is 40 ms and the FRP is 5, then the measurement gap is repeated 8 times. Hence there are 8 measurement gaps within the MGRP affecting the same number of HARQ processes.

According to an embodiment, the method further comprising setting a bit in the bitmap, previously set to "1", to "0" when a UE being allocated an identified measurement gap corresponding to the bit is no longer served by the base station.

In an example, when the base station serves a new UE, the method comprises searching the bitmap in order to find a bit which is set to "0" and when such a bit is found, allocating the corresponding gap offset and identified measurement gap to the new UE and setting said bit to "1", and wherein searching is performed such that the measurement gaps affecting the least number of HARQ processes are allocated first.

In this manner, the bitmap is continuously updated such that the base station searches the bitmap for a free bit, i.e. a bit set to "0", corresponding to a measurement gap currently not being used when a new UE becomes served by the base station.

According to an embodiment, the scheduling priorities are obtained anew and the measurement gaps are anew allocated to the UEs such that the UE having the highest scheduling priority is allocated the measurement gap affecting the lowest number of HARQ processes and setting the corresponding bit in said bitmap to "1" and setting bits corresponding to vacant measurement gaps to "0". This is performed in order to update the measurement gap allocation among the UEs such that the UE having the highest scheduling priority is being allocated the measurement gap affecting the lowest number of HARQ processes.

After the initial allocation of measurement gaps and gap offsets, UEs may enter and leave the cell associated with the base station. After a relatively long time and/or after a substantial number of UEs have entered and left the cell, it is possible that the currently allocated measurement gaps are not the ones affecting the fewest number of HARQ processes and/or that the UEs having the highest scheduling priorities are not currently allocated measurement gaps affecting the fewest number of HARQ processes. Hence the method is performed anew in order to ascertain that the currently allocated measurement gaps are the ones affecting the fewest number of HARQ processes and/or that the UEs having the highest scheduling priorities are currently allocated measurement gaps affecting the fewest number of HARQ processes.

Figure 2:
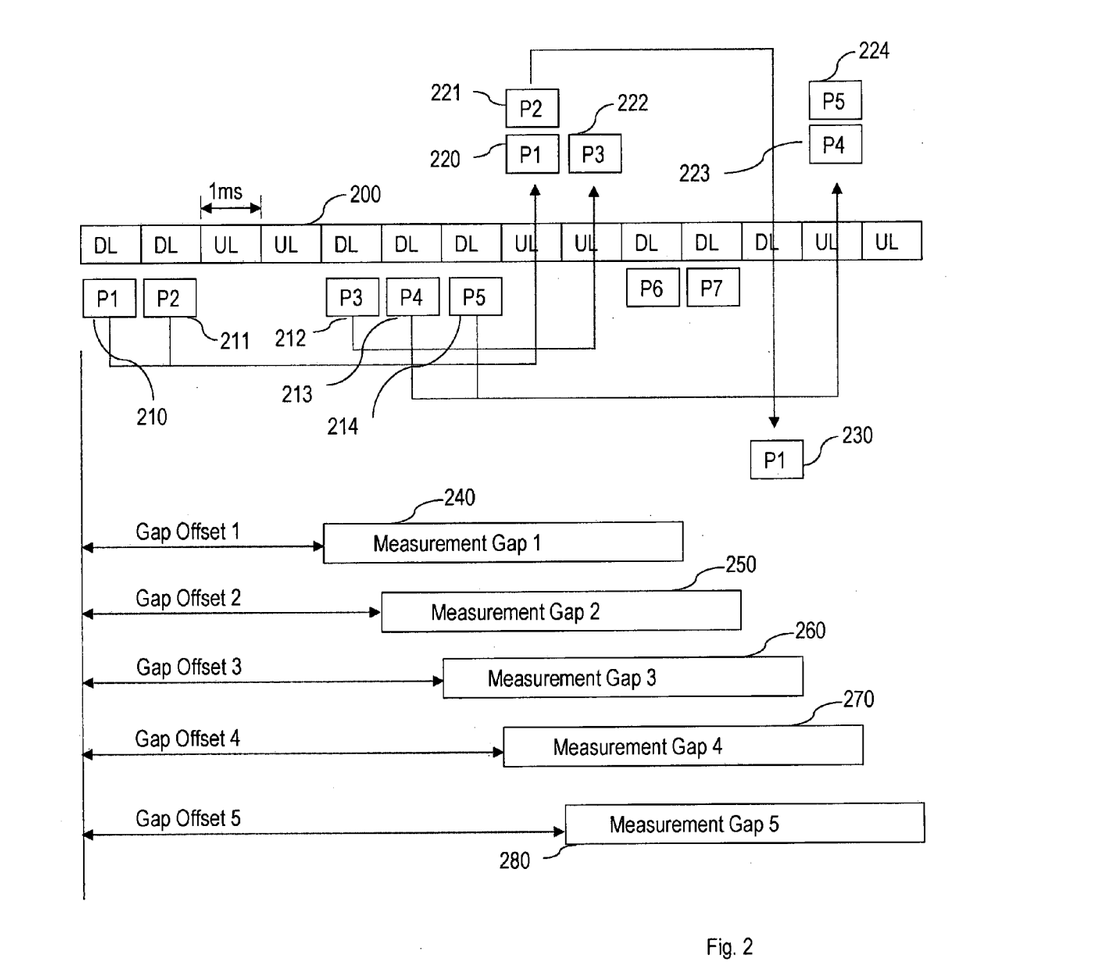
FIG. 2 is an illustration of a configuration of downlink an uplink in which DL:UL=3:2.

FIG. 2 is an illustration of a configuration in accordance with the above mentioned configuration example DL:UL=3: 2. In this figure a sequence 200 of consecutive subframes is illustrated. A subframe is 1 ms long. As stated before, an MGRP is 40 ms or 80 ms, so assuming the MGRP in this example starts at the first downlink subframe at the left in the figure, only part of the entire MGRP is shown.

The HARQ processes P1-P7 with reference numbers 210-214, i.e. underneath the sequence of consecutive subframes are downlink HARQ transmissions. The HARQ processes P1-P5 with reference numbers 220-224, i.e. above the sequence of consecutive subframes are ACK/NACK for the specific HARQ transmissions. FIG. 2 further illustrates five different measurement gaps 240-280 starting at five different gap offsets. Assuming a measurement gap would start at the beginning of the MGRP, then the gap offset would be 0. If a measurement gap would start after the first subframe, the gap offset would be 1. Hence, in FIG. 2, the respective gap offsets for the shown measurement gaps 240-280 are 4, 5, 6, 7 and 8.

In FIG. 2, HARQ transmissions P1 and P2 are received by the UE on PDCCH+PDSCH in one subframe each. If a measurement gap is allocated during the subframes when the reception of these HARQ transmissions are to be acknowledged, then the UE cannot send ACK/NACK to the base station and the base station will retransmit P1 and P2. In the example illustrated in FIG. 2, this would happen for measurement gaps 1-4 denoted 240-270. Further, for PDSCH the transmission is normally associated with a 10% Block Error Rate, BLER. As a consequence, whether or not the base station receives these NACKs has no impact on system throughput. Accordingly, there is a 90% possibility of an unnecessary retransmission.

In the case the MGL is 6 ms and the MGRP is 40 ms, then there is a maximum of 24 HARQ process chance. If all resources are used, i.e. each downlink subframe is occupied and there is only one UE in the cell being served by the base station, then a 40 ms MGRP corresponds to 4*10 ms (one radio frame is 10 ms). With the configuration of DL:UL=3:2, the total number of downlink subframes is 6 (3+3) in one radio frame of 10 ms. Since there are four radio frames and there are six downlink subframes in each radio frame, then the maximum number of HARQ processes during a MGRP is 6*4=24.

Looking at FIG. 2, it can be seen that for measurement gap 1, i.e. reference number 240 with a gap offset of 4, HARQ transmissions P3, P4, P5 and P6 from the base station will not be received by the UE. That is four HARQ processes being affected. Also the ACK/NACK for HARQ transmissions P1, P2 and P3 will not be sent by the UE. However, since P3 will not be received, no ACK/NACK can be sent. Therefore HARQ Process P1 and P2 will be wasted and there is a 10% NACK answer due to BLER. A NACK and no answer is the same for the base station. This means that there is a 90% possibility of wasting a HARQ process. 2 HARQ processes (P1 and P2) times 90% equals 1.8 processes. The total number of affected HARQ processes is 4+1.8=5.8.

With the same determinions for measurement gaps 2-5, then measurement gap 2 with reference number 250 and a gap offset of 5 will affect a total number of 6.7 HARQ processes. Also measurement gap 3 with reference number 260 and a gap offset of 6 will affect a total number of 6.7 HARQ processes. For measurement gap 4 with reference number 270, the total number of affected HARQ processes is 7.5 and for measurement gap 5 with reference number 280 the total number of affected HARQ processes is 8.4.

From this it can be seen that there is a maximum number of 24 HARQ process chance and that 5.8 to 8.4 HARQ processes will be affected for a UE due to a measurement gap. For a low load case, maximum 16.7% of the UEs peaking throughput gain is achievable based on measurement GAP offset selection. This is determined by (8.4−5.8)/(24−8.4). For a high load case, maximum 35% cell average throughput gain is achievable based on measurement GAP offset selection. This is determined by 8.4/24. In the high load case, the base station may schedule other UEs when a specific UE is measuring.

The same may be determined for another downlink-uplink configuration. For a configuration of DL:UL=4:1, four downlink subframes will be followed by one uplink subframe and then four downlink subframes and one uplink subframe. This will represent one radio frame of 10 ms. In one radio frame, there are 8 downlink subframes and there are 4 radio frames in one MGRP, assuming an MGRP is 40 ms. Then there is a maximum of 8*4=32 HARQ process chance. For the different measurement gaps, 7.7 to 9.3 HARQ processes will be affected. For a low load case, maximum 7% of the UEs peaking throughput gain is achievable based on measurement gap offset selection. For a high load case, maximum 29% cell average throughput gain is achievable based on measurement GAP offset selection According to an embodiment, an exemplifying method for searching the bitmap in order to find a free bit, i.e. a bit that is set to "0" is provided, which method is described below in pseudo code.

```
for k = 0:SPP-1
    for i = 0:log₂(MGRP/SPP)
        for j = 0:2^i - 1
            if (i≠0) && (j mod 2 = 0)
                continue;
            else if P_k + (MGRP/2^i)*j = vacant
                then allocate this gap offset
                Toggle the flag as allocated
            end
        end
    end
end
```

As an example, assume that gap offset 3 is chosen for a corresponding measurement gap. The Frame Repetition Period, FRP, is 5 and the MGRP is 40 ms. Then the gap offset mod FRP, i.e. "gap offset" mod 5, equals 3. The allocation sequence will be 3→23→13→33→8→ . . .

Figure 3:
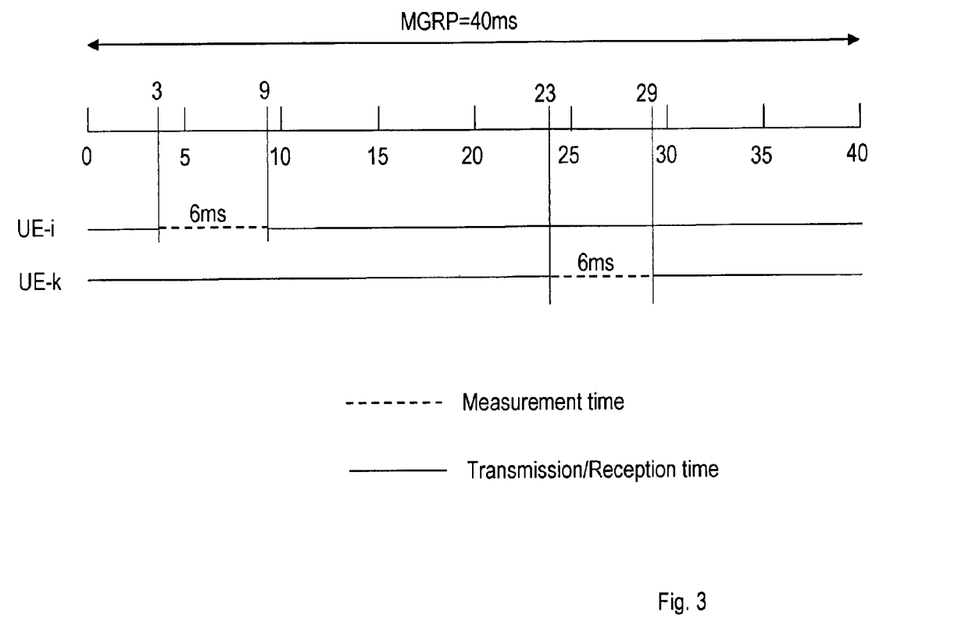
FIG. 3 is an illustration of two UEs being allocated a respective measurement gap according to an example.

FIG. 3 is an illustration of two UEs being allocated a respective measurement gap according to the above example.

Figure 4:
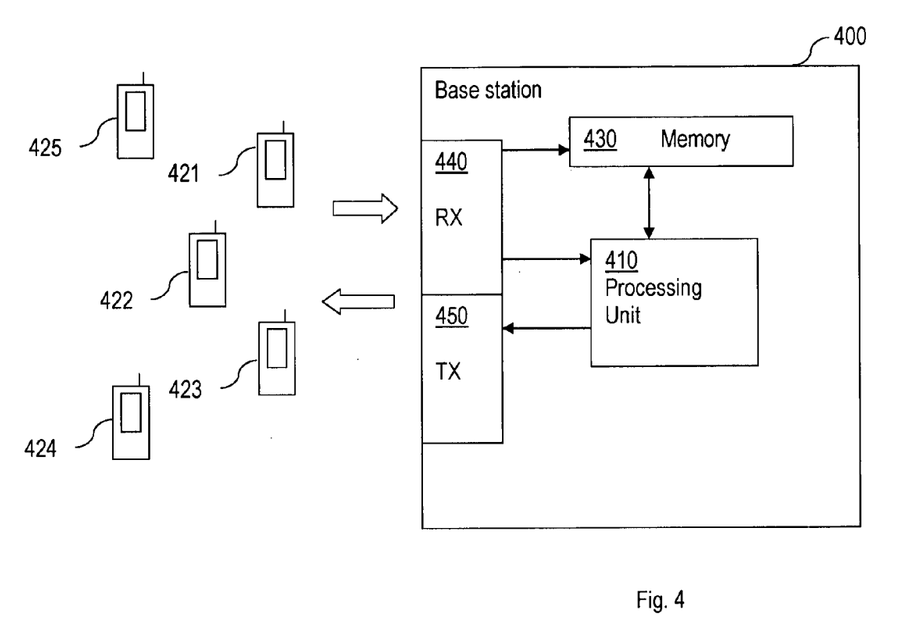
FIG. 4 is a block diagram of an exemplifying embodiment of a base station adapted to allocate measurement gaps within an MGRP to UEs currently being served by the base station.

FIG. 4 is a block diagram of an exemplifying embodiment of a base station adapted to allocate measurement gaps within an MGRP to UEs currently being served by the base station.

The base station has the same objects and advantages as the method in the base station as described above. Therefore, the base station will only be described briefly to avoid unnecessary repetition.

In FIG. 4, a base station 400 is illustrated having a processing unit 410 and the base station is serving a number of UEs 421-425. Further, the base station 400 is illustrated comprising a memory 430 comprising one or more memory units 430. The memory is arranged to be used to store data such as e.g. gap offsets, measurement gaps and applications to perform the methods herein when being executed in the radio base station 400. The base station 400 is illustrated comprising a receiving arrangement 440 and a transmitting arrangement 450.

The base station 400 is adapted to allocate measurement gaps within a Measurement Gap Repetition Period, MGRP, to UEs 421-425 currently being served by the base station 400. The base station 400 comprises a processing unit 410 adapted to identify a plurality of possible measurement gaps within the MGRP and to define respective gap offsets as the time from the beginning of the MGRP to the beginning of each of the plurality of possible measurement gaps. The processing unit is further adapted to determine, for the identified measurement gaps, a number of HARQ processes that would be affected due to the identified measurement gaps with regards to a starting point in time of the identified measurement gaps during the MGRP. The processing unit is further adapted to rank the identified measurement gaps depending on the number of HARQ processes which would be affected during the MGRP and to allocate the identified measurement gaps to the UEs 421-425 based on the ranking.

The processing unit is, in an example, adapted to allocate radio resources over the MGRP to UEs currently not being involved in measurements during a measurement gap. The processing unit has therefore, in this context, a function of a resource scheduler/allocator.

According to an embodiment, the processing unit 410 is further adapted to first allocate the identified measurement gap affecting to lowest number of HARQ processes to a UE and to thereafter allocate the next identified measurement gap affecting the second lowest number of HARQ processes to a further UE until all UEs which are being served by the base station are allocated a measurement gap.

As described above, in case there are more than one measurement gap which will affect the same number of HARQ processes, all these will be allocated before a measurement gap affecting more HARQ processes is allocated.

In an example, the processing unit 410 is further adapted to obtain scheduling priorities for the UEs, and to allocate the identified measurement gap affecting the lowest number of HARQ processes to the UE having the highest scheduling priority and to allocate the remaining UEs identified measurement gaps in descending order, with regards to scheduling priority, such that the UE having the lowest scheduling priority is allocated the identified measurement gap affecting the highest number of HARQ processes of the available identified measurement gaps. The processing unit 410 may obtain the scheduling priorities information from an internal memory of the base station which it has e.g. stored earlier or it may obtain from an external network node. Hence the embodiments are not restricted to any specific location where the scheduling priorities are retrieved i.e. internally or externally.

In yet an example, the processing unit 410 is further adapted to define respective gap offsets as the time from the beginning of the MGRP to the beginning of each of the plurality of possible identified measurement gaps and to initialize a bitmap of gap offsets by setting all bits to "0", each bit corresponding to a gap offset and when each identified measurement gap is being allocated to a UE, a corresponding gap offset is allocated to the UE, and its bit in the bitmap is set to "1".

In an example, the number of gap offsets and corresponding bits in the bitmap equals a number of subframes in the MGRP.

MGRP/FRP number of gap offsets have the same affect on the HARQ processes during a MGRP. In other words, a specific gap offset, k, affects the same number of HARQ processes MGRP/FRP number of times during a MGRP if the measurement gap starts at k+i*FRP, where i={0, 1, . . . , MGRP/FRP-1}.

In still an example, the processing unit 410 is further adapted to again set a bit in the bitmap, previously set to "1", to "0" when a UE being allocated an identified measurement gap corresponding to the bit is no longer being served by the base station 400.

According to an embodiment, the processing unit 410 is further adapted to search the bitmap in order to find a bit which is set to "0" when the base station starts to serve a new UE starts and when such a bit is found, to allocate the corresponding gap offset and identified measurement gap to the new UE and to set the bit to "1", wherein the bitmap is searched from the first bit in the bitmap such that the measurement gaps affecting the least number of HARQ processes are allocated first.

According to yet an embodiment, the processing unit 410 is further adapted to anew obtain the scheduling priorities and anew allocate the measurement gaps to the UEs such that the UE having the highest scheduling priority is allocated the measurement gap affecting the lowest number of HARQ processes and setting the corresponding bit in the bitmap to "1" and to set bits corresponding to vacant measurement gaps to "0" in order to update the measurement gap allocation among the UEs such that the UE having the highest scheduling priority is being allocated the measurement gap affecting the lowest number of HARQ processes.

The processing unit 410 may comprise different modules configured to perform the different steps as described above. For example, the processing unit 410 may comprise an identifying module, a ranking module and an allocating module.

It should be noted that FIG. 4 merely illustrates the functional unit in the base station in a logical sense. The function in practice may be implemented using any suitable software and hardware means/circuits etc. Thus, the embodiments are generally not limited to the shown structures of the base station and the functional unit. Hence, the previously described exemplary embodiments may be realised in many ways. For example, one embodiment includes a computer-readable medium having instructions stored thereon that are executable by the processing unit for performing the method. The instructions executable by the computing system and stored on the computer-readable medium perform the method steps of the embodiments as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the present embodiments and defined by the pending claims.

The invention claimed is:

1. A method in a base station for allocating measurement gaps within a Measurement Gap Repetition Period (MGRP) to User Equipments (UEs) currently being served by said base station, the method comprising:
   identifying a plurality of possible measurement gaps within said MGRP with regards to their starting point and duration in time within said MGRP;
   determining, for said identified measurement gaps, a number of Hybrid Automatic Repeat Request (HARQ) processes that would be affected due to said identified measurement gaps with regards to a starting point in time of said identified measurement gaps during said MGRP;
   ranking said identified measurement gaps depending on the number of HARQ processes that would be affected during said MGRP; and
   allocating said identified measurement gaps to said UEs based on said ranking.

2. The method of claim 1, further comprising first allocating the identified measurement gap affecting a lowest number of HARQ processes to a first UE followed by allocating the next identified measurement gap affecting a second lowest number of HARQ processes to a further served UE until all served UEs are allocated a measurement gap.

3. The method of claim 1, further comprising obtaining scheduling priorities for said UEs, wherein the UE having the highest scheduling priority is allocated the identified measurement gap affecting the lowest number of HARQ processes and the remaining UEs are allocated measurement gaps in descending order, with regards to scheduling priority, such that the UE having the lowest scheduling priority is allocated the identified measurement gap affecting the highest number of HARQ processes of the available identified measurement gaps.

4. The method of claim 1, further comprising defining respective gap offsets as the time from the beginning of said MGRP to the beginning of each of said plurality of possible identified measurement gaps, wherein a bitmap of possible gap offsets is initialized by setting all bits to a first value, where each bit corresponds to a gap offset, and when each identified measurement gap is being allocated to a UE, a corresponding gap offset is allocated and its bit in the bitmap is set to a second value.

5. The method of claim 4, further comprising obtaining scheduling priorities for said UEs, wherein the UE having the highest scheduling priority is allocated the identified measurement gap affecting the lowest number of HARQ processes and the remaining UEs are allocated measurement gaps in descending order, with regards to scheduling priority, such that the UE having the lowest scheduling priority is allocated the identified measurement gap affecting the highest number of HARQ processes of the available identified measurement gaps, wherein said scheduling priorities are obtained anew and said measurement gaps are anew allocated to said UE such that a UE having the highest scheduling priority is allocated the measurement gap affecting the lowest number of HARQ processes and setting the corresponding bit in said bitmap to the second value and setting bits corresponding to vacant measurement gaps to the first value in order to update the measurement gap allocation among the UEs.

6. The method of claim 4, wherein the number of gap offsets and corresponding bits in said bitmap equals a number of subframes in said MGRP.

7. The method of claim 4, further comprising setting a bit in the bitmap, previously set to the second value, to the first value when a UE being allocated an identified measurement gap corresponding to said bit is no longer served by said base station.

8. The method of claim 4, wherein when the base station serves a new UE, the method further comprising searching in said bitmap in order to find a bit which is set to the first value and when such a bit is found, allocating the corresponding gap offset and identified measurement gap to said new UE and setting said bit to the second value, and wherein searching is performed such that the measurement gaps affecting the least number of HARQ processes are allocated first.

9. A base station adapted to allocate measurement gaps within a Measurement Gap Repetition Period (MGRP) to User Equipments (UEs) currently being served by said base station, the base station comprising a processing unit adapted to:
   identify a plurality of possible measurement gaps within said MGRP;
   determine, for said identified measurement gaps, a number of Hybrid Automatic Repeat Request (HARQ) processes that would be affected due to said identified measurement gaps with regards to a starting point in time of said identified measurement gaps during said MGRP;
   rank said identified measurement gaps depending on the number of HARQ processes which would be affected during said MGRP; and
   allocate said identified measurement gaps to said UEs based on said ranking.

10. The base station of claim 9, wherein said processing unit is further adapted to first allocate the identified measurement gap affecting a lowest number of HARQ processes to a UE and to thereafter allocate the next identified measurement gap affecting a second lowest number of HARQ processes to a further UE until all served UEs are allocated a measurement gap.

11. The base station of claim 9, wherein said processing unit is further adapted to obtain scheduling priorities for said UEs and to allocate the identified measurement gap affecting the lowest number of HARQ processes to the UE having the highest scheduling priority and to allocate to the remaining UEs identified measurement gaps in descending order, with regards to scheduling priority, such that the UE having the lowest scheduling priority is allocated the identified measurement gap affecting the highest number of HARQ processes of the available identified measurement gaps.

12. The base station of claim 9, wherein said processing unit is further adapted to define respective gap offsets as the time from the beginning of said MGRP to the beginning of each of said plurality of possible identified measurement gaps and to initialize a bitmap of gap offsets by setting all bits to a first value, each bit corresponding to a gap offset and when each measurement gap is being allocated to a UE, a corresponding gap offset is allocated to the UE, and its bit in the bitmap is set to a second value.

13. The base station of claim 12, wherein said processing unit is further adapted to obtain scheduling priorities for said UEs and to allocate the identified measurement gap affecting the lowest number of HARQ processes to the UE having the highest scheduling priority and to allocate to the remaining UEs identified measurement gaps in descending order, with regards to scheduling priority, such that the UE having the lowest scheduling priority is allocated the identified measurement gap affecting the highest number of HARQ processes of the available identified measurement gaps; wherein said processing unit is further adapted to anew obtain said scheduling priorities and anew allocate said measurement gaps to said UEs such that a UE having the highest scheduling priority is allocated the measurement gap affecting the lowest number of HARQ processes and to set the corresponding bit in said bitmap to the second value and to further set bits corresponding to vacant measurement gaps to the first value in order to update the measurement gap allocation among the UEs.

14. The base station of claim 12, wherein the number of gap offsets and corresponding bits in said bitmap equals a number of subframes in said MGRP.

15. The base station of claim 12, wherein said processing unit is further adapted to again set a bit in the bitmap, previously set to the second value, to the first value when a UE being allocated an identified measurement gap corresponding to said bit is no longer being served by said base station.

16. The base station of claim 12, wherein when the base station starts to serve a new UE, the processing unit is further adapted to search said bitmap in order to find a bit which is set to the first value and when such a bit is found, to allocate the corresponding gap offset and identified measurement gap to said new UE and to set said bit to the second value, wherein the processing unit searches the bitmap such that the measurement gaps affecting the least number of HARQ processes are allocated first.

* * * * *